United States Patent [19]

Haas et al.

[11] Patent Number: 4,535,005

[45] Date of Patent: Aug. 13, 1985

[54] CONSOLIDATING THE SURFACE OF A GRANULAR ADSORBENT

[75] Inventors: Franz Haas; Gerhard Janisch; Gerold Schreyer, all of Ludwigshafen, Fed. Rep. of Germany

[73] Assignee: BASF Aktiengesellschaft, Ludwigshafen, Fed. Rep. of Germany

[21] Appl. No.: 473,602

[22] Filed: Mar. 9, 1983

[30] Foreign Application Priority Data

Mar. 30, 1982 [DE] Fed. Rep. of Germany ....... 3211629

[51] Int. Cl.$^3$ .......................... B05D 3/02; B05D 7/00
[52] U.S. Cl. .................................... 427/212; 427/221; 427/385.5; 428/407
[58] Field of Search .................... 427/221, 212, 385.5; 428/407

[56] References Cited

U.S. PATENT DOCUMENTS

| | | | |
|---|---|---|---|
| 2,988,782 | 6/1961 | Parrish et al. | 162/157.3 X |
| 3,544,507 | 12/1970 | Lloyd | 428/407 X |
| 4,081,402 | 3/1978 | Levy et al. | 521/29 |
| 4,112,185 | 9/1978 | Meiller | 428/331 X |
| 4,171,283 | 10/1979 | Nakashima et al. | 502/402 |

FOREIGN PATENT DOCUMENTS 2063228 11/1979 United Kingdom .

OTHER PUBLICATIONS

Chemical Abstracts, vol. 82, 1975, p. 119.

Primary Examiner—Michael R. Lusignan
Attorney, Agent, or Firm—Oblon, Fisher, Spivak, McClelland & Maier

[57] ABSTRACT

A process for consolidating the surface of a granular adsorbent, wherein a water-containing adsorbent, which has taken up 25–70% by weight of the maximum possible amount of water, is heated to a temperature at which the water taken up evaporates, and is at the same time treated with an aqueous dispersion of a self-crosslinking copolymer, and the adsorbent thus coated is heated to a temperature at which the copolymer crosslinks. The coated adsorbent has virtually the same adsorption and desorption properties as the untreated adsorbent, but in contrast exhibits substantially improved abrasion resistance.

4 Claims, No Drawings surface of the adsorbent open. If the process is carried out under atmospheric pressure it is necessary to heat the adsorbent to not less than 100° C. However, it is also possible to evaporate the water from the adsorbent under reduced pressure at a lower temperature, for example down to about 40° C.

In a third process step, the adsorbent is treated with an aqueous dispersion of a self-crosslinking copolymer. It is important that the water taken up should evaporate from the granular adsorbent during the treatment with the aqueous dispersion. Accordingly, process steps (2) and (3) take place virtually simultaneously. During the treatment with the copolymer dispersion the granular adsorbent is mixed so as to cover it as uniformly as possible with polymer particles from the dispersion. Preferably, the dispersion is sprayed onto the granular adsorbent. Sufficient copolymer is applied to the surface of the adsorbent to give a copolymer:adsorbent weight ratio of from 2:98 to 30:70, preferably from 4:96 to 10:90.

In a fourth process step, the adsorbent treated with dispersion is heated to 110°–180° C., preferably 120°–160° C., to crosslink the copolymer. This renders the originally thermoplastic copolymer infusible and insoluble in organic solvents, for example toluene, xylene or chlorohydrocarbons.

The dispersion particles precipitated on the granular adsorbent are firmly anchored to the latter and consolidate the surface of the adsorbent. They form a permeable coating on the adsorbent, so that the adsorption and desorption capacity of the material is virtually unimpaired. On the other hand, the abrasion is greatly reduced compared to the uncoated adsorbent, so that the granular adsorbent produced according to the invention can be employed for adsorption in an agitated bed.

Process steps (1), (2) and (3) can be repeated several times so as to give the requisite amount of copolymer on the adsorbent. However, an upper limit of 30 parts of copolymer per 70 parts of adsorbent should not be exceeded, since otherwise the adsorption and desorption properties of the material are adversely affected.

In the Examples which follow, parts and percentages are by weight.

The following polymer dispersions were used:

Dispersion 1:
A 40% strength aqueous dispersion of a copolymer of 53% of n-butyl acrylate, 28% of styrene, 13% of acrylonitrile, 4% of N-methylolmethacrylamide and 1% of acrylic acid.

Dispersion 2:
A 50% strength aqueous dispersion of a copolymer of 50% of butadiene, 40% of styrene, 5% of acrylic acid and 5% of N-methylolmethacrylamide.

Dispersion 3:
A 45% strength aqueous dispersion of a copolymer of 65% of butadiene, 30% of acrylonitrile and 5% of N-methylolacrylamide.

Dispersion 4:
A 50% strength aqueous dispersion of a copolymer of 80% of vinyl acetate, 17% of n-butyl acrylate and 3% of N-methylolmethacrylamide.

Dispersion 5:
A mixture of 95 parts of dispersion 3 and 5 parts of a heat sensitizer based on an adduct of 1 mole of ethylenediamine with 48 moles of propylene oxide and 20 moles of ethylene oxide, the adduct having inverse temperature dependence of solubility in water. This mixture is a heat-sensitive dispersion.

Dispersion 6:
A mixture of 120 parts of dispersion 1 and 5 parts of a commercial heat-sensitizer based on a quaternized polyadduct of 1 mole of ethylenediamine with 20 moles of propylene oxide and 5 moles of ethylene oxide. This mixture is a heat-sensitive dispersion.

EXAMPLE 1

500 parts by weight of a virtually dry active carbon having a mean particle diameter of 4 mm and an inner surface area of 1300 $m^2/g$ were (1) uniformly sprayed in an open vessel with 200 parts of water, and turned during this process. The active carbon contained 60% of the maximum possible amount of water which could be taken up. It was then (2) heated to 103° C., whereupon steam escaped and kept the pores and channels on the adsorbent surface open, and was thereafter (3) sprayed with 100 parts of dispersion 1. Care was taken to ensure that during spraying with dispersion 1, steam escaped from the granular active carbon. To achieve a uniform application of copolymer to the active carbon, the latter was turned repeatedly. Process steps (1), (2) and (3) were repeated a total of three times. The polymer-laden active carbon was then heated to 130° C. in order to crosslink the polymer particles on the carbon. The total crosslinking time was 3 minutes. An active carbon bearing a porous plastic coating was obtained. The ratio of copolymer to active carbon was 10:90. The surface of the granular active carbon was found to have been consolidated by the crosslinking process.

EXAMPLE 2

500 parts by weight of a virtually dry active carbon having a mean particle diameter of 4 mm and an inner surface area of 900 $m^2/g$ were sprayed uniformly with 150 parts of water at room temperature. This resulted in the active carbon taking up 40% of the maximum possible amount of water. It was then heated, in a second process step, to 105° C. in order to evaporate the water, and was sprayed, in a third process step, with 100 parts of dispersion 2 and 15 parts of water, turning the granular material repeatedly in order to obtain uniform application of the polymer. Process steps 1 to 3, ie. treatment of the active carbon with water, heating to above 100° C. and application of the polymer dispersion, were repeated a total of three times. Thereafter the weight ratio of polymer:active carbon was found to be 7:93.

The material coated in this manner was then heated to 130° C. in order to crosslink the copolymer. A granular active carbon, whose surface was consolidated with a polymer, was obtained.

EXAMPLE 3

500 parts by weight of active carbon having a mean particle diameter of 4 mm and an inner surface area of 1500 $m^2/g$ were uniformly sprayed with 180 parts of water in an open vessel, the active carbon being turned carefully. The carbon took up 50% by weight of the maximum possible amount of water corresponding to saturation. The water-laden active carbon was then heated to 105° C. and, when steam issued from it, was sprayed with 100 parts of dispersion 3 and 25 parts of water. The process steps of (1) loading the active carbon with water, (2) heating to 105° C. and (3) simultaneous treatment with dispersion 3 and 20 parts of water were repeated three times. This gave a copolymer-

CONSOLIDATING THE SURFACE OF A GRANULAR ADSORBENT

Adsorbents, for example active carbons, which are mostly employed in granular form in industrial adsorption processes, as a rule tend to dust, especially under mechanical load, such as arises, for example, on merely filling the adsorbent into an adsorption apparatus or, especially, on using the adsorbent in an agitated bed. The abrasion which occurs under such mechanical load can greatly interfere with subsequent process steps. In particular such abrasion can make it virtually impossible to employ many of the granular adsorbents in an agitated bed.

It is an object of the present invention to consolidate the surface of a granular adsorbent so that abrasion which occurs under mechanical load, especially in an agitated bed, is at least greatly reduced or substantially prevented.

We have found that this object is achieved, according to the invention, if the adsorbent, which initially contains virtually no water, (1) is treated with 25-70% by weight of the maximum possible amount of water which it can take up to saturation, (2) is heated to a temperature at which the water taken up evaporates, (3) and is treated, while water taken up is evaporating, with an aqueous dispersion of a self-crosslinking copolymer, while mixing, the ratio of the weight of copolymer adhering to the adsorbent to the weight of adsorbent being from 2:98 to 30:70 and, (4) the adsorbent thus coated is heated at from 110° to 180° C. in order to crosslink the copolymer.

Granular adsorbents which are of industrial importance and whose surfaces can be consolidated in accordance with the invention include, for example, carbon-containing adsorbents, such as active carbon, active coke and carbon molecular sieves, active aluminas, obtained, for example, by dehydrating and calcining aluminum hydroxide, silica gels and molecular sieve zeolites which are derived from natural and synthetic hydrated aluminosilicates of monofunctional or polyfunctional bases. Active carbons are preferred amongst the granular adsorbents. The inner surface area of the active carbon is in general from 400 to 1600 m$^2$/g, while the inner surface area of the other adsorbents is from 100 to 1000 m$^2$/g.

The mean particle diameter of the granular adsorbent is from 0.3 to 9, preferably from 2 to 5, mm.

The granular adsorbents are coated by a special process wherein permeable films or network-like structures are formed on the surfaces of the adsorbents. To consolidate the surfaces of granular adsorbents, aqueous dispersions of self-crosslinking copolymers are used, the essential feature of these copolymers being that they contain N-methylol and/or N-methylol ether groups as copolymerized structures. The copolymers contain, as copolymerized units, the following monomers, or mixtures of these monomers, as main constituents: styrene, acrylonitrile, vinyl chloride, vinylidene chloride, vinyl esters of saturated $C_1$-$C_4$ carboxylic acids, acrylic acid esters and methacrylic acid esters of monohydric $C_1$-$C_{12}$ alcohols, methacrylonitrile and buta-1,3-diene, as well as mixtures of styrene and butadiene, styrene and acrylonitrile, styrene and methacrylonitrile, butadiene and acrylonitrile or methacrylonitrile, styrene and an acrylate or methacrylate ester, vinyl acetate and an acrylate or methacrylate ester, or styrene, an acrylate ester and acrylonitrile. This group of monomers accounts for about 90-99.5% by weight of the copolymer structure. The copolymers contain, as characteristic groups, N-methylolamides of $\alpha,\beta$-monoolefinically unsaturated monocarboxylic and/or dicarboxylic acids of 3 to 5 carbon atoms, especially N-methylolacrylamide, N-methylolmethacrylamide and N-methylolfumarodiamide as well as the corresponding ethers, such as N-$C_1$-$C_4$-alkoxymethylamides of monoolefinically unsaturated monocarboxylic acids and dicarboxylic acids of 3 to 5 carbon atoms, eg. N-ethoxymethylmethacrylamide, N-n-butoxyethylacrylamide and N-isopropoxymethylmethacrylamide. The amount of such crosslinking monomers is in general from 0.5 to 10, preferably from 1 to 6% by weight based on the copolymers.

The copolymers may additionally contain, as copolymerized units, from 0 to 5% by weight of monoolefinically unsaturated carboxylic acids of 3 to 5 carbon atoms or the corresponding acid nitriles, eg. acrylic acid, methacrylic acid, fumaric acid, itaconic acid, acrylonitrile and methacrylonitrile.

The copolymers are prepared, by conventional methods, in the form of aqueous dispersions of about 40-55% strength by weight, which, because of the process of preparation, contain conventional assistants, such as anionic or nonionic emulsifiers. Such self-crosslinking polymer dispersions are commercially available.

Preferably, dispersions, formulated to be heat-sensitive, of self-crosslinking copolymers, prepared by copolymerizing N-methylolmethacrylamide with butylacrylate/styrene/acrylonitrile, butadiene/styrene/acrylic acid, butadiene/acrylonitrile or vinyl acetate/n-butyl acrylate, are used. The heat sensitizers are, for example, alkoxylated amines having an inverse temperature dependence of solubility in water; their use for heat-sensitizing dispersions is disclosed in British Pat. No. 1,422,873. Apart from these alkoxylated amines, a range of other sensitizers, for example water-soluble polyacetals, oxyalkylated polysiloxanes and cationic substances can be used. Specific sensitizers based on alkoxylated amines are disclosed in, for example, British Pat. No. 1,422,873. The anionic or non-ionic polymer dispersions of self-crosslinking polymers are heat-sensitized by adding from about 0.5 to 30% by weight, preferably from 1 to 10% by weight, of a sensitizer to the dispersion.

In order to produce a porous coating on the adsorbents, the latter are initially laden, in a first process step, with from 25 to 70, preferably from 30 to 60, % by weight of the maximum possible amount of water which they can take up to saturation. This amount differs for different granular adsorbents. Active carbon can as a rule take up one part by weight of water per part by weight of carbon. In order to load the granular adsorbents with water, the preferred procedure is to spray water onto the surface of a loose mass of the adsorbents, at the same time mixing the latter so as to ensure, as far as possible, that the material is uniformly laden with water. Another possible method is to blow steam onto a loose mass of adsorbent, while mixing the latter. Of course it is also possible to use adsorbents which already contain the requisite amount by weight of water.

In a second process step, the adsorbent is heated to a temperature at which the water taken up evaporates and in doing so keeps the pores and channels on the coated active carbon in which the ratio of polymer:active carbon was 5:95. The product obtained was heated to 150° C. to crosslink the copolymer. Crosslinking was completed after 4 minutes giving a granular active carbon which possessed a porous coating and had a consolidated surface.

EXAMPLE 4

500 parts by weight of an active carbon having a mean particle diameter of 4 mm and an inner surface area of 1500 m$^2$/g were sprayed in an open vessel with 200 parts by weight of water, while turning the carbon to ensure very uniform distribution of the water. The active carbon took up 60% of the saturation amount of water. It was then heated to 105° C. and sprayed with 100 parts of dispersion 4 and 25 parts of water when steam issued from the carbon. During spraying with the dispersion, the active carbon was turned several times so as to ensure very uniform covering with polymer particles. Steam continuously issued from the active carbon particles during the spraying with the dispersion. The process steps of (1) loading the active carbon with water, (2) heating to 105° C. and (3) treatment with dispersion 4 and water, were repeated a total of three times. After that, the ratio of copolymer:active carbon of the coated product was 6:94. To crosslink the copolymer and consolidate the surface of the granular active carbon, the coated material was heated to 130° C. The crosslinking reaction was complete after 3 minutes.

EXAMPLE 5

500 parts by weight of an active carbon having a mean particle diameter of 4 mm and an inner surface area of 1100 m$^2$/g were sprayed at room temperature with 150 parts of water, the carbon being turned during spraying. The water content of the active carbon was 30% of the saturation value. The sprayed active carbon was then heated to 130° C., whereupon steam issued from it. 100 parts of dispersion 5 and 10 parts of water were sprayed onto the carbon at 130° C. as long as the evolution of steam continued. The process steps of treating the active carbon with water, heating to 130° C. and treatment with dispersion 5 and water were repeated a total of three times. The coated granular material was then additionally heated for 4 minutes at 130° C. The copolymer crosslinked under these conditions, giving a granular active carbon having a consolidated surface. The weight ratio of copolymer:active carbon in the coated material was 5:95.

EXAMPLE 6

Example 4 was repeated, but instead of the dispersion described there, 100 parts of dispersion 6 were used. A coated granular active carbon was obtained which had a consolidated surface and in which the ratio of copolymer:active carbon was 4:96.

Testing the granular coated active carbon

The abrasion loss was determined by introducing 100 g portions of the material to be tested into a 1 liter cylinder and allowing the latter to rotate on a roller stand for 200 hours. After this time, the untreated granular active carbon had been virtually completely converted to a powder, while sieve analyses showed that in the case of the granular active carbons coated according to the invention, as described in Examples 1 to 6, the abrasion losses were less than 2%.

In a further series of tests, the absorbency of the untreated active carbon and of the active carbon coated according to Examples 1 to 6 was tested by introducing the samples to be examined into an adsorption apparatus and passing through this a toluene/air mixture containing 1000 ppm of toluene. The adsorbencies are shown in the table which follows.

TABLE

| Granular active carbon according to Example no. | Adsorbency [%] of the untreated active carbon | Adsorbency [%] of the active carbon coated according to the invention | Abrasion Loss [%] of the untreated active carbon | Abrasion Loss [%] of the active carbon coated according to the invention |
| --- | --- | --- | --- | --- |
| 1 | 44 | 40 | about 100 | 2 |
| 2 | 40 | 39 | about 100 | 2 |
| 3 | 46 | 45 | about 100 | 2 |
| 4 | 44 | 40 | about 100 | 2 |
| 5 | 38 | 38 | about 100 | 2 |
| 6 | 44 | 46 | about 100 | 2 |

In addition, the desorption rate was tested. It was found that the desorption characteristics of the six samples coated according to the invention corresponded to those of the untreated active carbon granules.

By consolidating the surfaces of active carbons in accordance with the present invention, it becomes possible to employ granular active carbons in agitated bed processes, thereby realizing the potential advantages over conventional fixed bed processes.

We claim:

1. A process for consolidating the surface of a granular adsorbent, wherein the adsorbent, which initially contains virtually no water,
    (1) is treated with 25–70% by weight of the maximum possible amount of water which it can take up to saturation,
    (2) is heated to a temperature at which the water taken up evaporates,
    (3) and is treated, while water taken up is evaporating, with an aqueous dispersion of a self-crosslinking copolymer, while mixing, the ratio of the weight of copolymer adhering to the adsorbent to the weight of adsorbent being from 2:98 to 30:70 and,
    (4) the adsorbent thus coated is heated at from 110° to 180° C. in order to crosslink the copolymer.

2. A process as claimed in claim 1, wherein the self-crosslinking copolymer contains N-methylol and/or N-methylol-ether groups as copolymerized structures.

3. A process as claimed in claim 1 or 2, wherein a heat-sensitized dispersion is employed.

4. A granular active carbon, having an inner surface area of 400–1600 m$^2$/g and a mean particle diameter of 0.3–9 mm, wherein the surface of the particles has been consolidated by the process as claimed in claim 1.

* * * * *